United States Patent [19]
Chaussy

[11] Patent Number: 6,137,244
[45] Date of Patent: Oct. 24, 2000

[54] HORIZONTAL DEVIATION CORRECTION CIRCUIT AND METHOD FOR A TELEVISION SET

[75] Inventor: Danika Chaussy, Montchaboud, France

[73] Assignee: SGS-Thomson Microelectronics S.A., Gentilly, France

[21] Appl. No.: 09/030,992

[22] Filed: Feb. 26, 1998

[30] Foreign Application Priority Data

Feb. 28, 1997 [FR] France ................................ 97 02636

[51] Int. Cl.[7] .............................. H01J 29/56; H01J 29/70; G09G 1/04
[52] U.S. Cl. .......................................... 315/371; 315/370
[58] Field of Search .................................... 315/370, 371

[56] References Cited

U.S. PATENT DOCUMENTS

| | | | |
|---|---|---|---|
| 4,687,972 | 8/1987 | Haferl | 315/371 |
| 4,827,193 | 5/1989 | Watanuki et al. | 315/371 |
| 4,893,065 | 1/1990 | Yamanaka | 315/371 |
| 4,935,674 | 6/1990 | Rodriguez-Cavazos | 315/368.13 |
| 4,972,127 | 11/1990 | Rodriguez-Cavazos et al. | 315/371 |
| 5,449,982 | 9/1995 | Ando | 315/371 |
| 5,497,055 | 3/1996 | George | 315/371 |
| 5,550,441 | 8/1996 | George | 315/371 |
| 5,633,566 | 5/1997 | Boettner et al. | 315/371 |
| 5,814,952 | 9/1998 | Maige et al. | 315/371 |

OTHER PUBLICATIONS

French Search Report from French Patent Application 97 02636, filed Feb. 28, 1997.

*Primary Examiner*—Edward P. Westin
*Assistant Examiner*—Nikita Wells
*Attorney, Agent, or Firm*—Wolf, Greenfield & Sacks, P.C.; James H.. Morris; Theodore E. Galathay

[57] ABSTRACT

The present invention relates to a method for correction of the horizontal scanning current of a cathode-ray tube based on a modulation of this scanning current by a substantially parabolic signal at the image frame frequency, obtained by a squaring of a current ramp, including inflecting the ends of this current ramp before its squaring.

35 Claims, 4 Drawing Sheets

HORIZONTAL DEVIATION CORRECTION CIRCUIT AND METHOD FOR A TELEVISION SET

BACKGROUND OF THE INVENTION

1. Field of the Invention

The present invention relates to the field of television sets and, more specifically, to the correction of the horizontal deviation of the electron beam of a cathode-ray tube during an image frame.

2. Discussion of the Related Art

In a cathode-ray tube, the image is obtained by a vertically scanning (for example at a frequency on the order of 50 kHz) and horizontally scanning (for example at a frequency on the order of 15.6 kHz) an electron beam on a phosphor screen. Since the screen is not spherical but rather planar, the scanning requires certain corrections to avoid image deformation.

The present invention more specifically applies to the so-called "pincushion" or "east/west" correction correcting the deformations on the left-hand and right-hand sides of the screen by modifying the horizontal scanning current during an image frame.

FIG. 1 very schematically shows a substantially rectangular screen 1 of a cathode-ray tube. This drawing illustrates the deformation undergone by an image 2 (hatched surface area in FIG. 1) in the absence of pincushion correction.

The pincushion correction is generally obtained by modulating the horizontal scanning current by an approximately parabolic signal of a duration substantially corresponding to the period of an image frame.

FIG. 2 shows, in the form of a block diagram, a conventional example of pincushion correction circuit.

The pincushion correction is obtained by modulating (MODUL. 3) the horizontal scanning current HB of cathode-ray tube 4 with an approximately parabolic signal p. This signal p is obtained by a so-called "Gilbert" multiplier G-MULT. 5, the function of which is to square ($x^2$) a current ramp $i_{ramp}$, symmetrical with respect to the ground and to the image frame frequency, and issued by a generator RAMP 6.

For certain cathode-ray tubes, and specifically for so called "wide-angle" (for example, on the order of 110°) cathode-ray tubes for which the screen is closer to the electron gun than in a tube with a smaller angle, the image deformation is performed not only on the right-hand and left-hand edges, but also at the screen corners.

For this type of screen, a so-called "corner" correction which has the object of modifying the ends of parabola p in order to inflect them more or less significantly is also provided.

FIGS. 3A to 3C illustrate the functional principle of a conventional corner correction circuit. FIG. 3A partially shows screen 1 in a vertical orientation. FIG. 3B shows in dotted lines the outlook of signal p of FIG. 2 and, in full lines, the outlook of a correction signal p', obtained by subtracting to signal p, for example, a sinx signal (not shown). The three dotted lines in FIG. 3B and the three dotted lines in FIG. 3A are used to show the relationship between the instanteous magnitude of signal p (and for that matter signal p') and the position on the screen 1. That is, the points designated by the three vertical dotted lines (leftmost, centermost, rightmost) in FIG. 3B occur at the three positions respectively designated by the three vertical dotted lines (leftmost, centermost, rightmost) in FIG. 3A. FIG. 3C shows the outlook of current $i_{ramp}$ during an image frame period T. As illustrated in FIG. 3C, frame flyback interval RT between two image frames is used to cause the decrease of current $i_{ramp}$ until the following ramp. The cross-over point of the current $i_{ramp}$, designated by the left-most dotted line in FIG. 3C, occurs at the same point as that designated in FIG. 3B by the longest of the three vertical dotted lines.

A disadvantage of a corner correction circuit consisting of adding or subtracting to parabola p in $x^2$, a sinx function, in $x^4$ or other, to obtain a parabola p', the ends of which have a slope CC (FIG. 3B) which is lower than that of parabola p, is that the added deformation also deforms the central portion CP of the parabola.

A difficulty of the corner correction is that it varies according to the cathode-ray tubes and is not, like the pincushion correction, substantially defined by a simple function ($x^2$) independent from the tube involved. For a given type of tube, only the distances d on either side of the center h0 of the screen in the height h from which the slope of the ends of parabola p must be smaller are known, together with the amplitude of this slope reduction.

Document EP-A-0 561 043 describes a corner correction system in which the ends of the parabola are corrected after raising to the square of a linear ramp for obtaining this parabola.

SUMMARY OF THE INVENTION

The present invention aims at providing a novel horizontal deviation correction method and circuit which overcome the disadvantages of conventional systems and which solve the abovementioned problems.

The present invention also aims at providing a circuit in which a modification of the distances from which the parabola must be inflected is particularly simple and requires no modification of the circuit design.

The present invention further aims at making the shape of the corner correction adjustable.

The invention also aims at achieving a circuit of minimum surface area.

To achieve these and other objects, the present invention provides a method for correcting of the horizontal scanning current of a cathode-ray tube based on a modulation of this scanning current by a substantially parabolic signal at the image frame frequency, obtained by a squaring of a current ramp, including the step of inflecting the ends of this current ramp before its squaring.

According to an embodiment of the present invention, this method includes obtaining a corrected current ramp by adding or subtracting to a linear current ramp of the same frequency as the image frame frequency, a corner correction signal, of the same frequency as the image frame frequency and exhibiting a zero value in a central portion of the linear current ramp.

According to an embodiment of the present invention, the corner correction signal exhibits, at low value, at the beginning and at the end of each period, a damped exponential shape.

According to an embodiment of the present invention, the corner correction signal is obtained from the linear current.

The present invention also provides horizontal scanning current correction circuit for a cathode-ray tube of the type including a modulator of the horizontal scanning current with a signal of substantially parabolic shape obtained by means of a multiplier squaring a current ramp at the frequency of the images frames, also including means for inflecting the ends of the current ramp, obtained from a generator of a linear ramp, which is symmetrical with respect to the ground.

According to an embodiment of the present invention, the above-mentioned means include a rectifier of the linear current ramp to issue a sawtooth-shaped signal referenced with respect to the ground; a transition circuit for canceling the sawtooth-shaped signal in a central portion of the period, the transition circuit issuing a corner correction signal; and an adder for adding or subtracting to the linear current ramp the corner correction circuit.

According to an embodiment of the present invention, a circuit for setting the amplitude of the corner correction signal is interposed between an output of the transition circuit and an input of the adder.

According to an embodiment of the present invention, the means for setting the corner correction amplitude is formed of an R/2R network.

According to an embodiment of the present invention, the transition circuit includes two bipolar transistors connected as current mirrors, a first transistor being diode-connected and receiving, on its collector, the sawtooth-shaped current, a second transistor providing, on its collector, the corner correction current and receiving, on its emitter, a constant current, the respective emitters of both transistors being grounded via two resistors of the same value.

According to an embodiment of the present invention, this constant current is adjustable.

The foregoing objects, features and advantages of the present invention will be discussed in detail in the following non-limiting description of specific embodiments in connection with the accompanying drawings.

DETAILED DESCRIPTION

Figure 1:
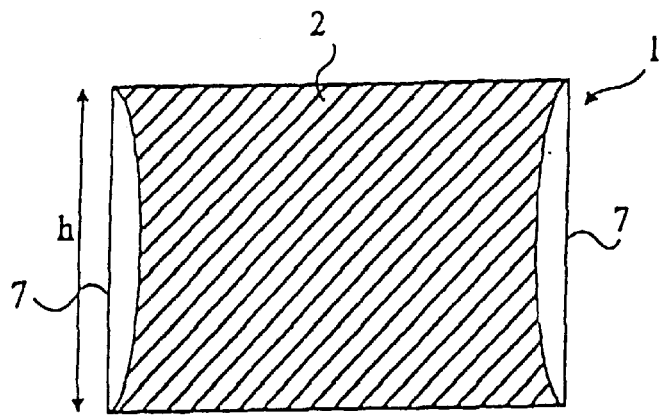
FIGS. 1 to 3 previously described are meant to show the state of the art and the problem to solve.
Figure 2:
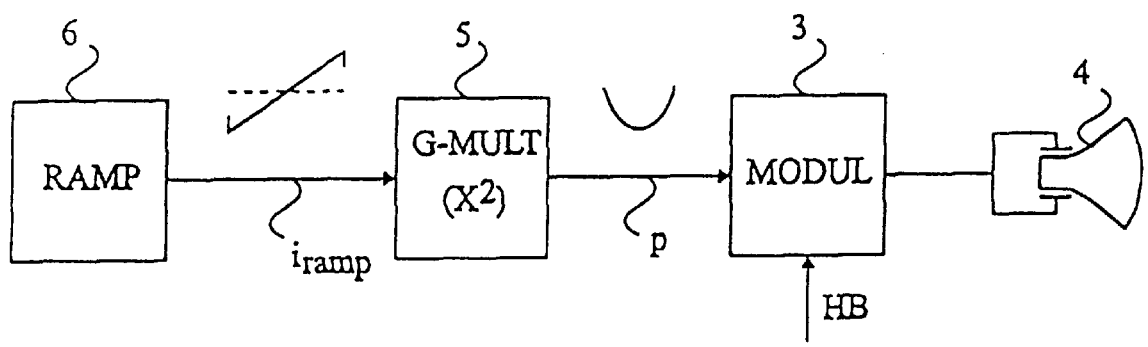
Figure 3A:
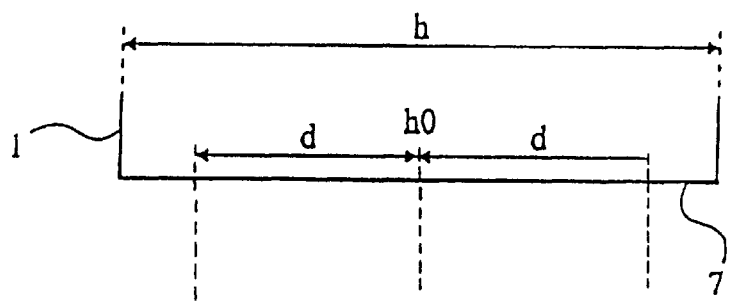
Figure 3B:
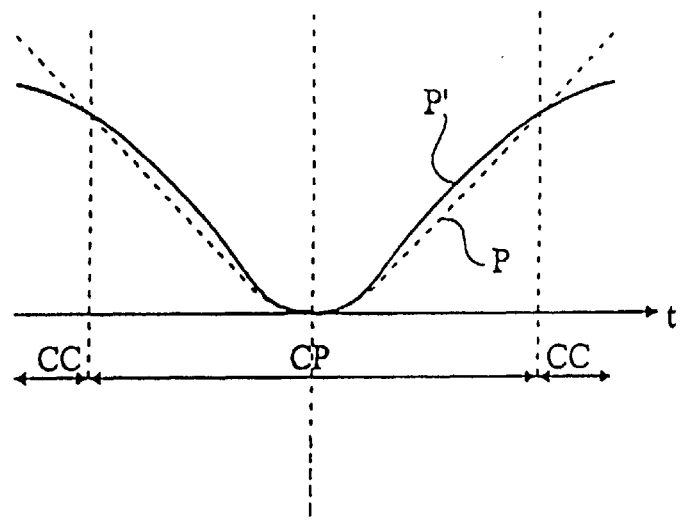
Figure 3C:
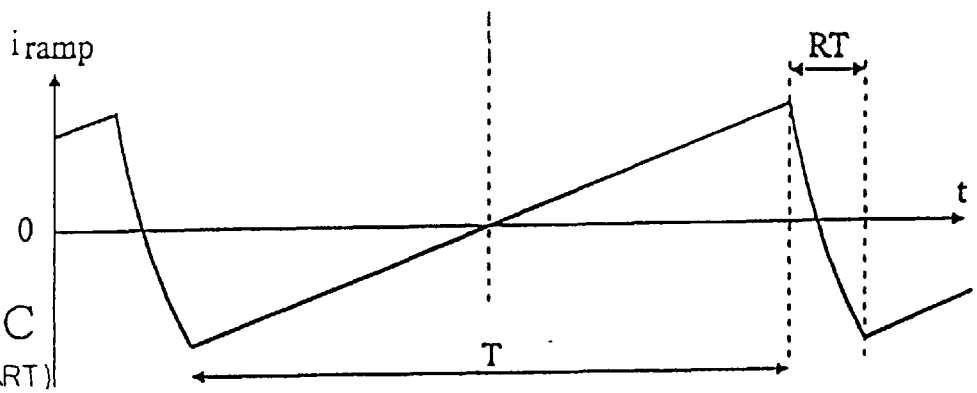

The same elements have been referred to with the same reference numbers in the different drawings. For clarity, the timing diagrams of FIGS. 3 and 6 are not to scale and only those elements necessary to the understanding of the present invention have been shown in the drawings.

A characteristic of the present invention is to modify the current ramp used to obtain the horizontal scanning current correction signal, before this ramp is squared to give it a parabolic shape.

Figure 4:
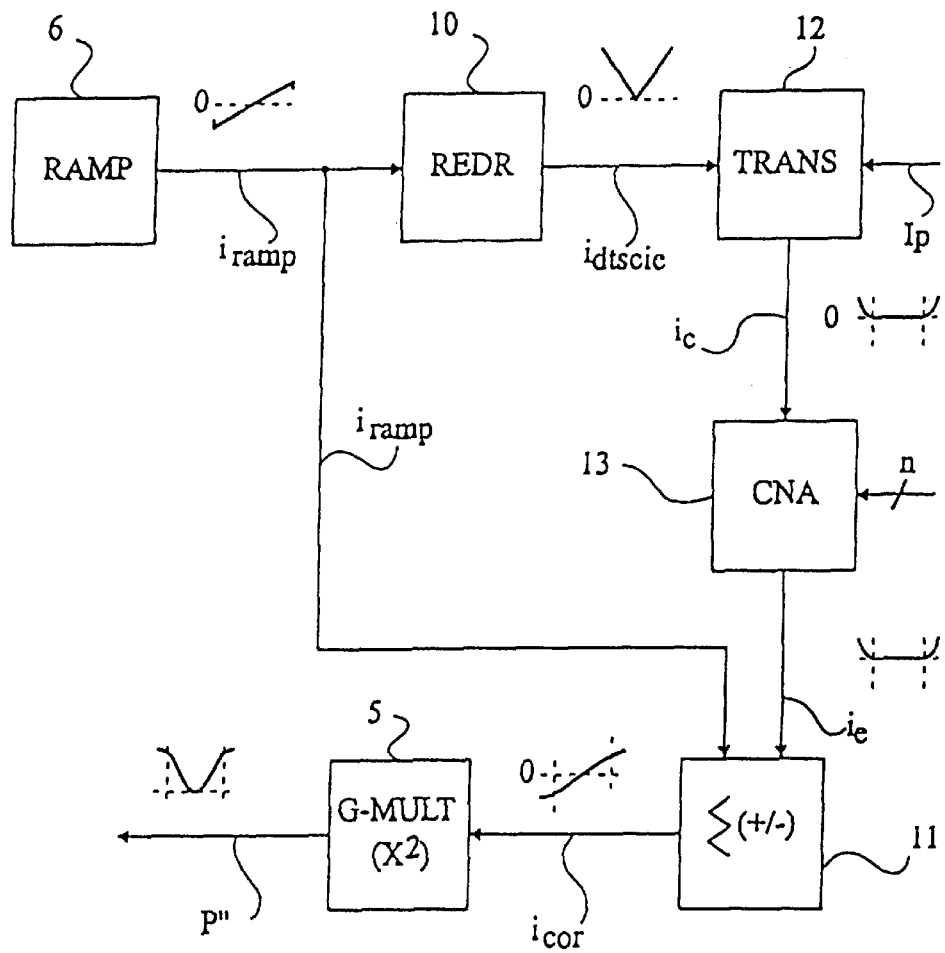
FIG. 4 shows, in the form of a block diagram, an embodiment of the horizontal scanning current correction circuit of a cathode-ray tube according to the present invention.

FIG. 4 shows a correction circuit according to the present invention.

As previously, this circuit includes a generator 6 of a current ramp $i_{ramp}$ at a frequency corresponding to the frame frequency of the cathode-ray tube. The circuit also includes, conventionally, a Gilbert multiplier 5, the function of which is to issue an approximately parabolic signal p" of modulation of the horizontal scanning current of the cathode-ray tube. The modulator and the cathode-ray tube have not been shown in FIG. 4 for clarity.

According to the present invention, multiplier 5 receives a signal $i_{cor}$ shaped as a current ramp at the frequency of-the image frames, and the slope of which is corrected at its ends.

Signal $i_{ramp}$ issued by generator 6 is, according to the present invention, sent onto a rectifying circuit 10 (REDR.) which issues a sawtooth-shaped signal $i_{dtscie}$ referenced to the ground and symmetrical with respect to the middle of the period.

According to the present invention, signal $i_{cor}$ is obtained by adding or by subtracting to signal $i_{ramp}$ a corner correction signal $i_e$, the frequency of which corresponds to the frame frequency and which has, at the beginning and at the end of a period, a non-zero value and, in the intermediary portion of the period, a zero value. This corner correction signal $i_e$ is obtained from signal $i_{dtscie}$ and is sent onto a first input of an adder 11, a second input of which receives signal $i_{ramp}$. Adder 11 issues signal $i_{cor}$.

In the embodiment shown, it is assumed that adder 11 is provided with means for choosing between an addition and a subtraction of signal $i_e$ to signal $i_{ramp}$ according to whether the period is beginning or ending. It could, however, be provided that signal $i_e$ is positive at the beginning of a period and negative at the end of a period, and that adder 11 only performs an addition of signals $i_e$ and $i_{ramp}$.

A first solution to obtain signal $i_e$ from signal $i_{dtscie}$ is to use a switching system to keep, assigning them with a proportionality coefficient lower than 1, only the ends of maximum amplitude of signal $i_{dtscie}$. However, such a solution would cause a break at the slope changing points in signal $i_{cor}$. These breaking points would reappear in parabolic signal P" and would be visible on the screen.

According to the present invention the slope change of signal $i_{cor}$ occurs smoothly, that is, without any break.

For this purpose and according to the embodiment shown in FIG. 4, signal $i_{dtscie}$ is sent onto a transition circuit 12 (TRANS.), the function of which is to issue signal $i_c$ referenced to the ground and of the same frequency as the image frame frequency. This signal $i_c$ is zero in the entire central portion (CP, FIG. 3C) of the current ramp, and is positive and of substantially exponential shape at the beginning and at the end (CC, FIG. 3C) of each image frame. Circuit 12 receives a constant current Ip, the function of which is to shift the reference of signal $i_{dtscie}$. A specific embodiment of circuit 12 will be described hereafter in relation with FIG. 5.

If desired, signal $i_c$ is sent to a circuit 13 which issues corner correction signal $i_e$, The function of circuit 13 is to modify the amplitude of signal $i_c$. In one embodiment, for example, the circuit 13 comprises a digital-to-analog converter formed from an R/2R network, and the current $i_c$ forms the foot current for the network. The analog-to-digital converter is controlled, for example, by an n-bit digital signal.

In one embodiment of the invention, signals $i_c$ and $i_e$ are referenced to the ground and are null in the central portion of the frames.

Figure 5:
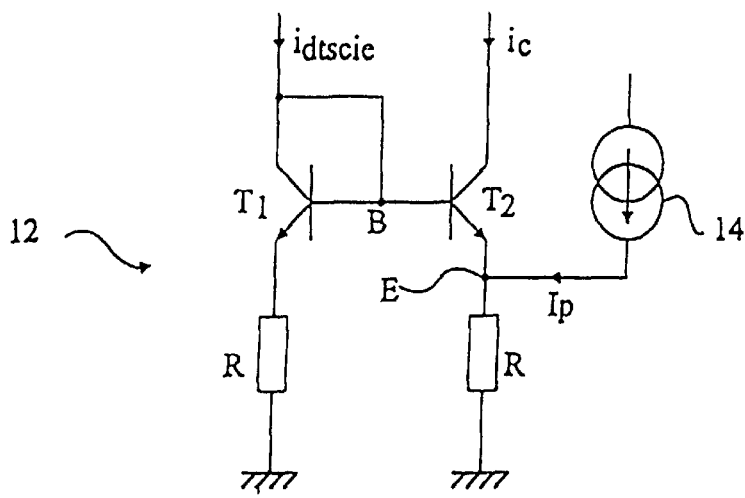
FIG. 5 shows an embodiment of a transition block of the circuit shown in FIG. 4.

FIG. 5 shows a particularly simple embodiment of a transition block 12 for generating signal $i_c$ from signal $i_{dtscie}$. Circuit 12 is formed of two bipolar transistors T1 and T2 connected as current mirrors, and the respective emitters of which are connected to the ground via two resistors R of the same value. The collector of transistor T1 receives current $i_{dtscie}$ and is connected to its base. The collector of transistor T2 provides current $i_c$ and its emitter receives current Ip issued by a constant current source 14.

Figure 6A:
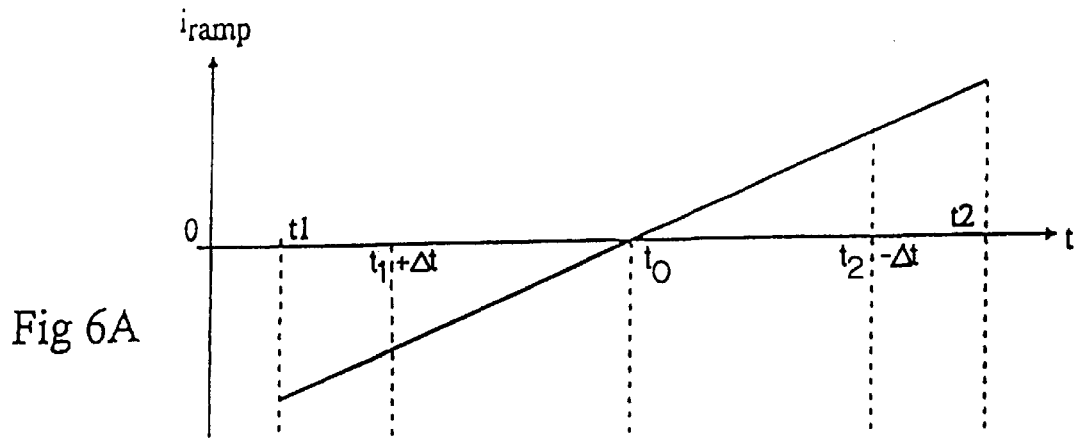
FIGS. 6A to 6D illustrate, in the form of timing diagrams, the operation of a circuit such as shown in FIG. 4.
Figure 6B:
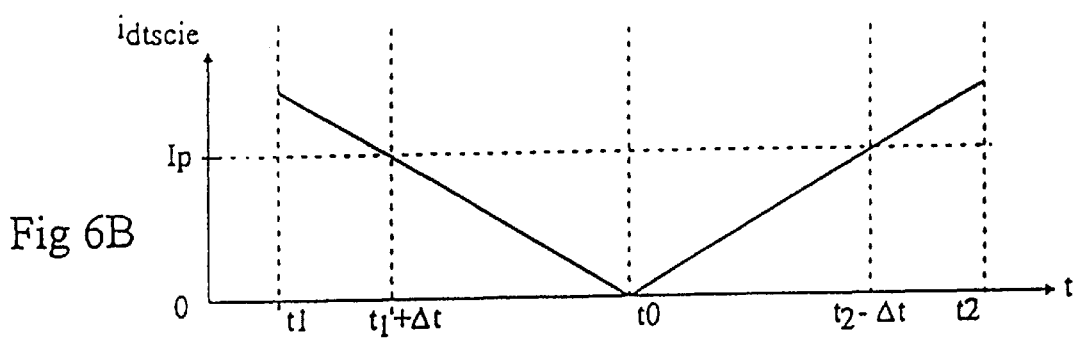
Figure 6C:
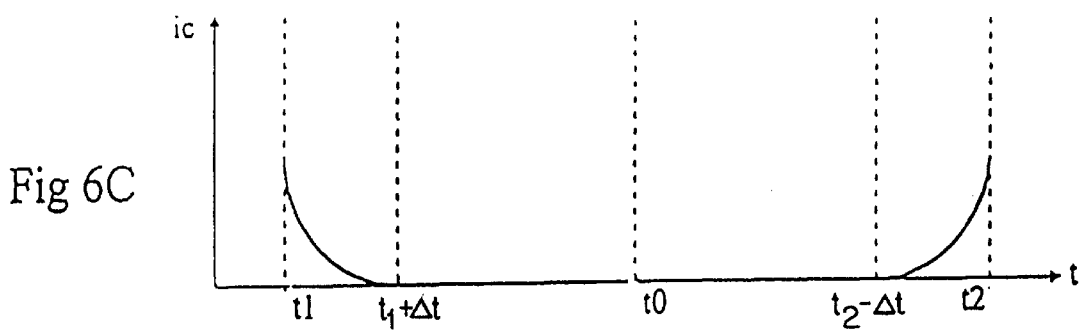

The operation of circuit 12 shown in FIG. 5 will be discussed in relation with FIGS. 6A and 6B which illustrate the operation of a correction circuit such as shown in FIG. 4.

FIGS. 6A to 6D show, respectively, an example of shape of signals $i_{ramp}$, $i_{dtscie}$, $i_c$ and $i_{cor}$ during a period T corresponding to the duration of an image frame. FIGS. 6A–6D have a common time scale. Commonly labeled points in the time scales in FIGS. 6A–6D represent the same point in time.

t1 refers to the beginning time of a period T and t2 refers to the ending time of this period.

According to the present invention, current Ip is adjustable according to distance d (FIG. 3A) from which the corner correction must be performed with respect to the median height h0 of the screen, and thus according to the cathode-ray tube. This setting is, for example, a function of a resistive ratio. Thus, the design of the circuit according to the present invention does not need to be modified from one series or one type of tubes to another. It is enough to modify the values of resistors setting current Ip to modify the threshold from which the corner correction must be performed. As concerns time, position h0 corresponds to a time t0 of the middle of period T and the distance d on either side of position h0 corresponds to times t1+Δt and t2−Δt of a period T.

Current $i_c$ (FIG. 6C) is obtained from a circuit such as shown in FIG. 5.

Between times t1+Δt and t2−Δt, transistor T2 is non-conducting, current $i_{dtscie}$ being lower than current Ip. Current $i_c$ is then zero. The emitter potential (node E) of transistor T2 is constant. Conversely, the base potential (node B) of transistor T1 varies linearly with current $i_{dtscie}$ and is equal to the base emitter voltage drop (Vbe) of transistor T1 plus the voltage drop in resistor R (substantially corresponding to the product of the value of this resistor R by current $i_{dtscie}$).

Between times t1 and t1+Δt and between times t2−Δt and t2, transistor T2 is on. However, the variation of current $i_c$, for small values of this current, exhibits a shape which is exponential with the increase of the base potential of transistor T2 (node B). This shows another function of current Ip which is to damp the exponential increase of current $i_c$ upon power-on of transistor T2 (or its decrease, upon its blocking).

The exponential shape of current $i_c$ depends on the surface area ratio between transistors T1 and T2 and on the values of resistors R. For a given slope of current $i_{dtscie}$ and for a given surface area ratio, the slope of signal $i_c$ (associated with the potential increase of node E and thus to the slope of current $i_{dtscie}$) is directly proportional to the value of resistors R. Similarly, for a given value of resistors R, the slope of current ic is directly proportional to the surface area ratio between transistors T1 and T2. It is thus necessary to size resistors R and transistors T1 and T2 adequately to avoid the occurrence of a breaking point.

Signal $i_e$ (FIG. 4) has not been shown in FIGS. 6 since it has substantially the same shape as signal $i_c$, the R/2R network 13 modifying its amplitude only.

Figure 6D:
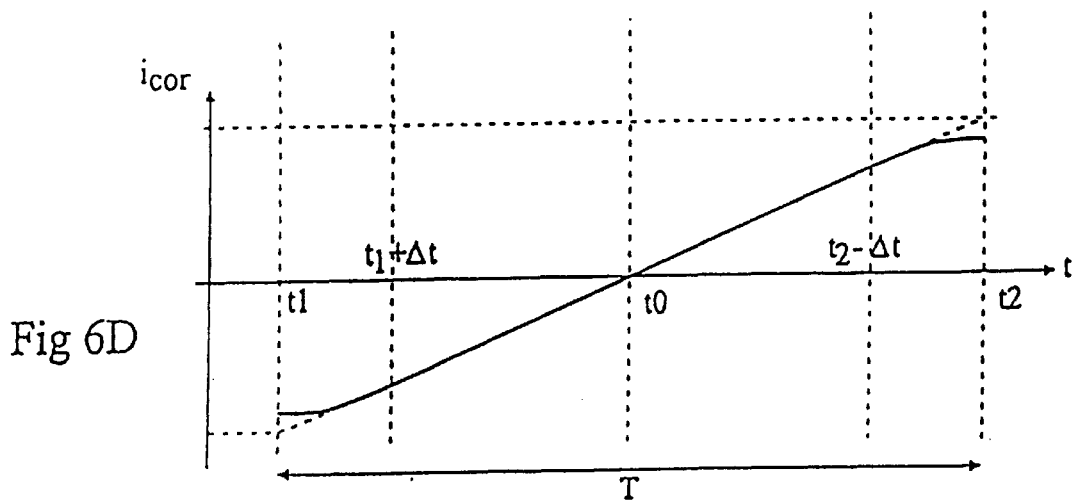

FIG. 6D illustrates the shape of current $i_{cor}$ obtained at the output of adder 11. The slope of current $i_{cor}$ corresponds to the slope of signal $i_{ramp}$ between times t1+Δt and t2−Δt, and this slope is damped (lower) between times t1 and t1+Δt and between times t2−Δt and t2.

Thus, by squaring signal $i_{cor}$ by means of the Gilbert multiplier (5, FIG. 4), a signal p" of substantially parabolic shape, the ends of which are damped, is obtained.

An advantage of the present invention is that it is not necessary to modify the structure of the design of the correction circuit from a series or from a type of cathode-ray tubes to another.

Another advantage of the present invention is that the amplitude of the corner correction is adjustable without requiring any intervention on the circuit.

Another advantage of the present invention is that, by inflecting the ends of the linear ramp $i_{ramp}$ before raising it to the square for obtaining the parabola p", a single multiplier 5 is necessary. Thus, regarding document EP-A-0 561 043, the invention saves one multiplier which constitutes one of the largest elements of a correction circuit.

The practical implementation of the correction circuit according to the present invention is within the abilities of those skilled in the art. Especially, the implementation of the ramp generator, of the rectifier issuing the sawtooth-shaped signal, of the digital-to-analog converter based on an R/2R network, of the adder, and of the Gilbert multiplier, are within the abilities of those skilled in the art as well as their adaptation to the frame frequency and to the amplitudes of the control circuit of the cathode-ray tube.

Of course, the present invention is likely to have various alterations, modifications, and improvements which will readily occur to those skilled in the art. In particular, although the adjustment of current Ip has been described as being a function of a resistive ratio, current Ip can be made variable, for example, by means of a digital-to-analog converter.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of correction of a horizontal scanning current of a cathode-ray tube from a modulation of the horizontal scanning current by a substantially parabolic signal at an image frame frequency, obtained by a squaring of a current ramp, including the step of inflecting the ends of the current ramp before its squaring.

2. The method of claim 1, including the steps of obtaining a corrected current ramp by adding or subtracting to a linear current ramp of the same frequency as the image frame frequency, a corner correction signal, of the same frequency as the image frame frequency and exhibiting a zero value in a central portion of the linear current ramp.

3. The method of claim 2, including the step of exhibiting a damped exponential shape, at low value, at the beginning and at the end of each period of the corner correction signal.

4. The method of claim 3, including the step of obtaining the corner correction signal from the linear current ramp.

5. A circuit for correcting a horizontal scanning current of a cathode-ray tube, of the type including a modulator of the horizontal scanning current with a signal of substantially parabolic shape obtained by means of a multiplier squaring a current ramp at the frequency of the images frames; further including means for inflecting the ends of the current ramp, obtained from a generator of a linear ramp, which is symmetrical with respect to the ground.

6. The circuit of claim 5, wherein said means for inflecting the ends of the current ramp include;

a rectifier of the linear current ramp to issue a sawtooth-shaped signal referenced with respect to the ground;

a transition circuit for canceling the sawtooth-shaped signal in a central portion of the linear current ramp, the transition circuit issuing a corner correction signal; and an adder for adding or subtracting to the linear current ramp, the corner correction signal.

7. The circuit of claim 6, wherein a circuit for setting of the amplitude of the corner correction signal is interposed between an output of the transition circuit and an input of the adder.

8. The circuit of claim 7, wherein the circuit for setting of the amplitude of the corner correction signal is formed of an R/2R network.

9. The circuit of claim 6, wherein the transition circuit includes first and second bipolar transistors mounted as current mirrors, the first transistor being diode-mounted and receiving, on its collector, the sawtooth-shaped signal, the second transistor issuing, on its collector, the corner correction signal and receiving, on its emitter, a constant currents the respective emitters of both transistors being grounded via two resistors of same value.

10. The circuit of claim 9, wherein the constant current is adjustable.

11. A method of correcting the horizontal scanning current of a cathode-ray tube, comprising the steps of:
generating a current ramp signal;
modifying the current ramp signal into a correction signal by inflecting the ends of the current ramp signal; and
squaring the correction signal to provide a substantially parabolic signal at an image frame frequency.

12. The method of claim 11 wherein the step of generating a current ramp signal comprises generating a linear current ramp 13. The method of claim 12 including obtaining the correction signal by adding or subtracting, to the linear current ramp of the same frequency as the image frame frequency, a corner correction signal, of the same frequency as the image frequency and exhibiting a zero value in a central portion of the linear current ramp.

14. The method of claim 13, wherein the corner correction signal exhibits, at low value, at the beginning and at the end of each period, a damped exponential shape.

15. The method of claim 14, wherein the corner correction signal is obtained from the linear current ramp.

16. The method of claim 13, including deriving said corner correction signal from said current ramp signal.

17. The method of claim 16, including rectifying the current ramp signal to provide a sawtooth-shaped signal.

18. The method of claim 17 wherein the sawtooth-shaped signal is symmetrical with respect to the middle of the period.

19. The method of claim 18 wherein the sawtooth-shaped signal is referenced to ground.

20. The method of claim 19 including transitioning the sawtooth-shaped signal to an initial corner correction signal as a function of a current, the function of which is to shift the reference of the sawtooth-shaped signal.

21. The method of claim 20 including amplifying the initial corner correction signal to derive the final corner correction signal.

22. A circuit for correcting a horizontal scanning current of a cathode-ray tube, of the type including a modulator of the horizontal scanning current, said circuit comprising:
a current ramp generator;
an inflection circuit for inflecting the ends of the current ramp to thus provide a correction signal;
and a multiplier coupled from said inflection circuit and providing a squaring of the correction signal at the frequency of the image frame.

23. The circuit of claim 22, wherein said current ramp is symmetrical with respect to ground.

24. The circuit of claim 22, wherein said inflection circuit includes;
a rectifier of the linear current ramp to issue a sawtooth-shaped signal referenced with respect to the ground;
a transition circuit for canceling the sawtooth-shaped signal in a central portion of the period, the transition circuit issuing a corner correction signal; and
an adder for adding or subtracting to the linear current ramp the corner correction signal.

25. The circuit of claim 24, wherein a circuit for setting of he amplitude of the corner correction signal is interposed between an output of the transition circuit and an input of the adder.

26. The circuit of claim 25, wherein the circuit for amplitude setting of the corner correction is formed of an R/2R network.

27. The circuit of claim 24, wherein the transition circuit includes two bipolar transistors mounted as current mirrors, a first transistor being diode-mounted and receiving, on its collector, the sawtooth-shaped current, a second transistor issuing, on its collector, the corner correction current and receiving, on its emitter, a constant current, the respective emitter, of both transistors being grounded via two resistors of same value.

28. The circuit of claim 27, wherein the constant current is adjustable.

29. A circuit for correcting a horizontal scanning current of a cathode-ray tube, of the type including a modulator of the horizontal scanning current, said circuit comprising:
a current ramp generator;
means for inflecting the ends of the current ramp to thus provide a correction signal;
and a multiplier coupled from said inflecting means and providing a squaring of the correction signal at the frequency of the image frame.

30. The circuit of claim 29, wherein said current ramp is symmetrical with respect to ground.

31. The circuit of claim 29, wherein said means for inflecting includes;
a rectifier of the linear current ramp to issue a sawtooth-shaped signal referenced with respect to the ground;
a transition circuit for canceling the sawtooth-shaped signal in a central portion of the period, the transition circuit issuing a corner correction signal; and
an adder for adding or subtracting to the linear current ramp the corner correction circuit.

32. The circuit of claim 31, wherein a circuit for setting of the amplitude of the corner correction signal is interposed between an output of the transition circuit and an input of the adder.

33. The circuit of claim 32, wherein the circuit for amplitude setting of the corner correction is formed of an R/2R network.

34. The circuit of claim 30, wherein the transition circuit includes trio bipolar transistors mounted as current mirrors, a first transistor being diode-mounted and receiving, on its collector, the sawtooth-shaped current, a second transistor issuing, on its collector, the corner correction current and receiving, on its emitter, a constant current, the respective emitters of both transistors being grounded via two resistors of same value.

35. The circuit of claim 34, wherein the constant current is adjustable.

* * * * *